(12) United States Patent
Lundstrom et al.

(10) Patent No.: US 9,163,760 B2
(45) Date of Patent: Oct. 20, 2015

(54) PIPE JOINT RESTRAINT APPARATUS

(75) Inventors: Michael Loyal Lundstrom, Eastland, TX (US); Sean Christian Schaefer, Cisco, TX (US)

(73) Assignee: EBAA IRON, INC., Eastland, TX (US)

( * ) Notice: Subject to any disclaimer, the term of this patent is extended or adjusted under 35 U.S.C. 154(b) by 277 days.

(21) Appl. No.: 13/157,103

(22) Filed: Jun. 9, 2011

(65) Prior Publication Data
US 2012/0313368 A1 Dec. 13, 2012

(51) Int. Cl.
*F16L 23/024* (2006.01)

(52) U.S. Cl.
CPC .......... *F16L 23/024* (2013.01); *Y10T 29/49741* (2015.01)

(58) Field of Classification Search
USPC .......... 285/373, 419, 382, 414, 415, 367, 368
See application file for complete search history.

(56) References Cited

U.S. PATENT DOCUMENTS

| | | | | |
|---|---|---|---|---|
| 591,828 | A * | 10/1897 | Duncan | 285/339 |
| 808,923 | A * | 1/1906 | Herrock | 285/342 |
| 817,300 | A * | 4/1906 | David | 285/364 |
| 964,609 | A * | 7/1910 | Clark | 285/337 |
| 1,935,027 | A * | 11/1933 | Heggem | 166/89.1 |
| 2,668,066 | A * | 2/1954 | Stadelhofer | 285/363 |
| 2,775,469 | A * | 12/1956 | Brown et al. | 285/18 |
| 2,779,610 | A | 1/1957 | Risley | |
| 3,252,192 | A | 5/1966 | Smith | |
| 3,594,023 | A | 7/1971 | Yano | |
| 4,568,112 | A | 2/1986 | Bradley et al. | |
| 4,805,932 | A | 2/1989 | Imhof et al. | |
| 5,118,139 | A | 6/1992 | Lott | |
| 5,190,324 | A | 3/1993 | Bird et al. | |
| 5,197,768 | A | 3/1993 | Conner | |
| 5,209,524 | A | 5/1993 | Corwon et al. | |
| 5,464,228 | A | 11/1995 | Weber et al. | |
| 5,772,253 | A | 6/1998 | Hodge et al. | |
| 5,911,446 | A | 6/1999 | McLennan et al. | |
| 5,934,334 | A * | 8/1999 | Gray et al. | 138/112 |
| 6,106,029 | A | 8/2000 | DeMore et al. | |
| 6,131,957 | A | 10/2000 | Saito et al. | |
| 6,302,450 | B1 | 10/2001 | Dole et al. | |
| 6,305,719 | B1 | 10/2001 | Smith et al. | |
| 6,364,367 | B1 | 4/2002 | Hintzen | |
| 6,517,122 | B1 | 2/2003 | Minemyer | |
| 6,565,125 | B2 | 5/2003 | Robison, Jr. | |
| 6,945,570 | B2 | 9/2005 | Jones | |
| 7,093,863 | B2 | 8/2006 | Holmes et al. | |
| 7,219,934 | B2 * | 5/2007 | McMahon et al. | 285/420 |
| 7,384,076 | B2 | 6/2008 | Bradley | |
| 7,661,731 | B2 | 2/2010 | Bradley | |
| 8,096,591 | B2 * | 1/2012 | Gentile et al. | 285/415 |

(Continued)

FOREIGN PATENT DOCUMENTS

WO    WO 2006/047437    5/2006

OTHER PUBLICATIONS

International Search Report mailed Jun. 28, 2012, by the ISA/US, in connection with PCT/US2012/033858.

(Continued)

*Primary Examiner* — James Hewitt
*Assistant Examiner* — James Linford
(74) *Attorney, Agent, or Firm* — Haynes and Boone, LLP

(57) ABSTRACT

An arcuate member is clamped onto a pipe so that a protrusion or ridge penetratingly engages the outside surface of the pipe.

2 Claims, 8 Drawing Sheets

(56) References Cited

U.S. PATENT DOCUMENTS

| | | | |
|---|---|---|---|
| 2002/0033604 | A1 | 3/2002 | Minemyer |
| 2006/0087121 | A1 | 4/2006 | Bradley |
| 2008/0203727 | A1 | 8/2008 | Bradley |
| 2011/0121567 | A1 | 5/2011 | Gentile, Jr. et al. |

OTHER PUBLICATIONS

Written Opinion mailed Jun. 28, 2012, by the ISA/US, in connection with PCT/US2012/033858.

EBAA Iron, Inc.; Series 2500 Restraint for C905 PVC Pipe at PVC Fittings 14 inch through 48 inch; 2005.

EBAA Iron, Inc.; Series 2500 Restraint for C900 PVC Pipe at PVC Fittings 4 inch through 12 inch; 2007.

International Preliminary Report on Patentability mailed Jun. 5, 2007, by the ISA/US, in connection with International Application No. PCT/US2005/038223.

International Search Report mailed May 10, 2007, by the ISA/US, in connection with International Application No. PCT/US2005/038223.

Written Opinion mailed May 10, 2007, by the ISA/US, in connection with International Application No. PCT/US2005/038223.

Office Action mailed Oct. 5, 2006 by the USPTO, regarding U.S. Appl. No. 10/971,407.

Office Action mailed Jan. 18, 2007 by the USPTO, regarding U.S. Appl. No. 10/971,407.

Office Action mailed Oct. 4, 2007 by the USPTO, regarding U.S. Appl. No. 10/971,407.

Notice of Allowance mailed Jan. 30, 2008 by the USPTO, regarding U.S. Appl. No. 10/971,407.

Office Action mailed Apr. 8, 2009, by the USPTO, regarding U.S. Appl. No. 12/111,653.

Notice of Allowance mailed Sep. 30, 2009, by the USPTO, regarding U.S. Appl. No. 12/111,653.

Search Report, issued Oct. 16, 2009, by the European Patent Office, regarding EP App No. 05817410.3.

Examination Report, issued Feb. 15, 2010, by the European Patent Office, regarding EP App No. 05817410.3.

\* cited by examiner

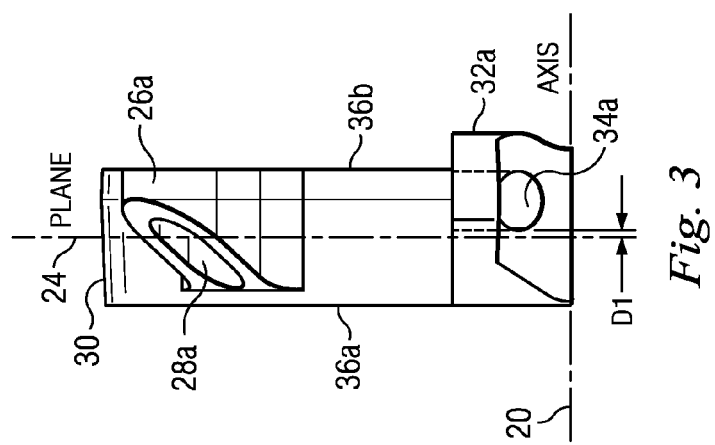
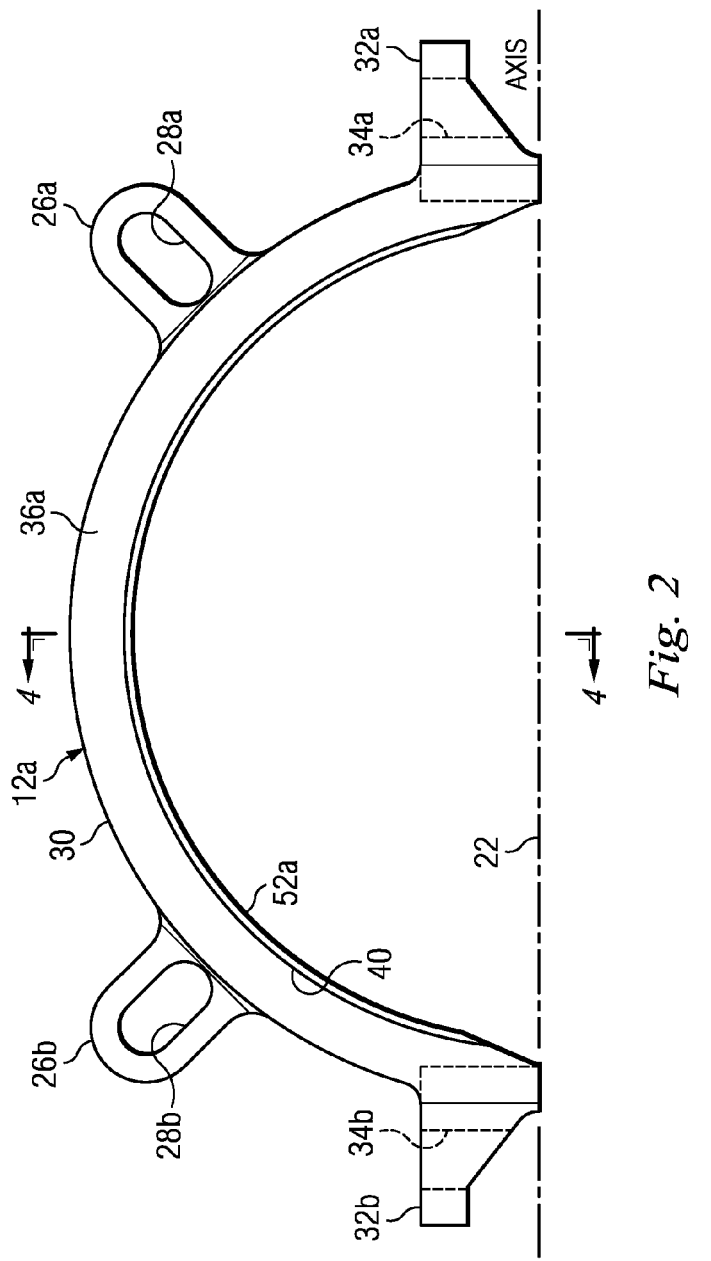
Fig. 2
Fig. 3

PIPE JOINT RESTRAINT APPARATUS

BACKGROUND

This disclosure relates in general to an apparatus for installation on a pipe, and in particular to an apparatus employed in the restraint of connected pipes to prevent the separation thereof.

A connection that joins two adjacent pipes in a fluid-transporting pipeline system is sometimes subjected to internal fluid pressure and other forces that tend to deflect or separate one pipe from the other. To combat this separation, a pipe joint restraint apparatus or device may be installed across the connection between the two pipes to maintain the pipes in a fixed position relative to each other. However, as the radial wall thicknesses of pipes used in such fluid-transporting pipelines are decreased, and the pressure ratings of the pipes are increased, the risk of failure in the pipes and/or the pipe joint restraint devices installed thereacross may increase. Therefore, what is needed is an apparatus, method or system that addresses this problem.

BRIEF DESCRIPTION OF THE DRAWINGS

FIG. 2 is a front elevational view of a portion of the apparatus, according to an exemplary embodiment.

FIG. 3 is a right side elevational view of the portion of the apparatus of FIG. 2, according to an exemplary embodiment.

DETAILED DESCRIPTION

Figure 1:
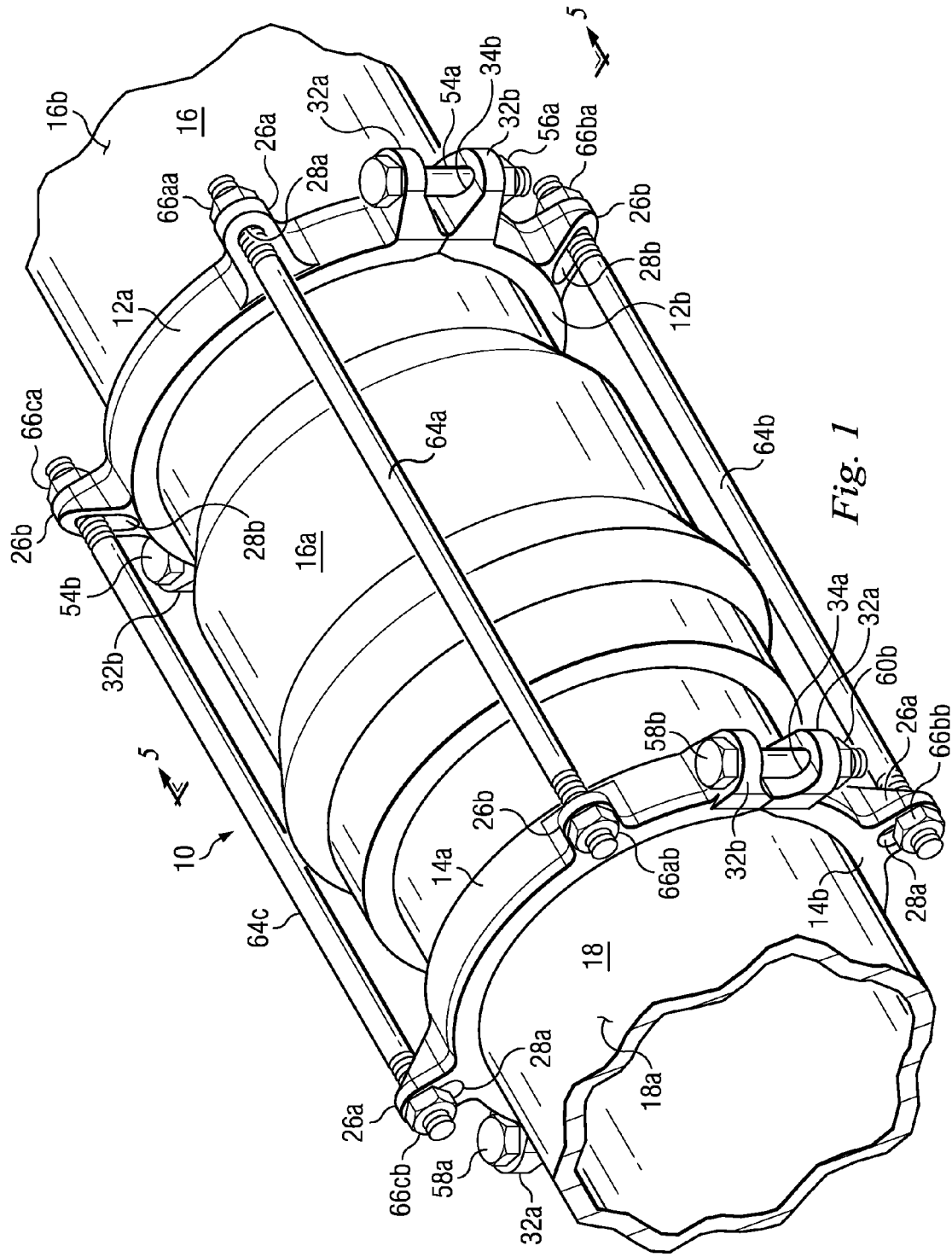
FIG. 1 is a perspective view of an apparatus clamped around connected pipes, according to an exemplary embodiment.

In an exemplary embodiment, as illustrated in FIG. 1, a pipe joint restraint apparatus is generally referred to by the reference numeral 10 and includes two spaced pairs of arcuate members 12a and 12b, and 14a and 14b. Each pair of arcuate members 12a and 12b, and 14a and 14b, forms a ring that envelops portions of and clamps onto connected pipes 16 and 18, respectively. The pipe 16 includes a bell 16a, which receives a spigot extending from the pipe 18 (spigot not shown). The pipes 16 and 18 may be sealingly engaged, and may be made of different types of materials such as, for example, polyvinylchloride (PVC) or ductile iron.

Figure 4:
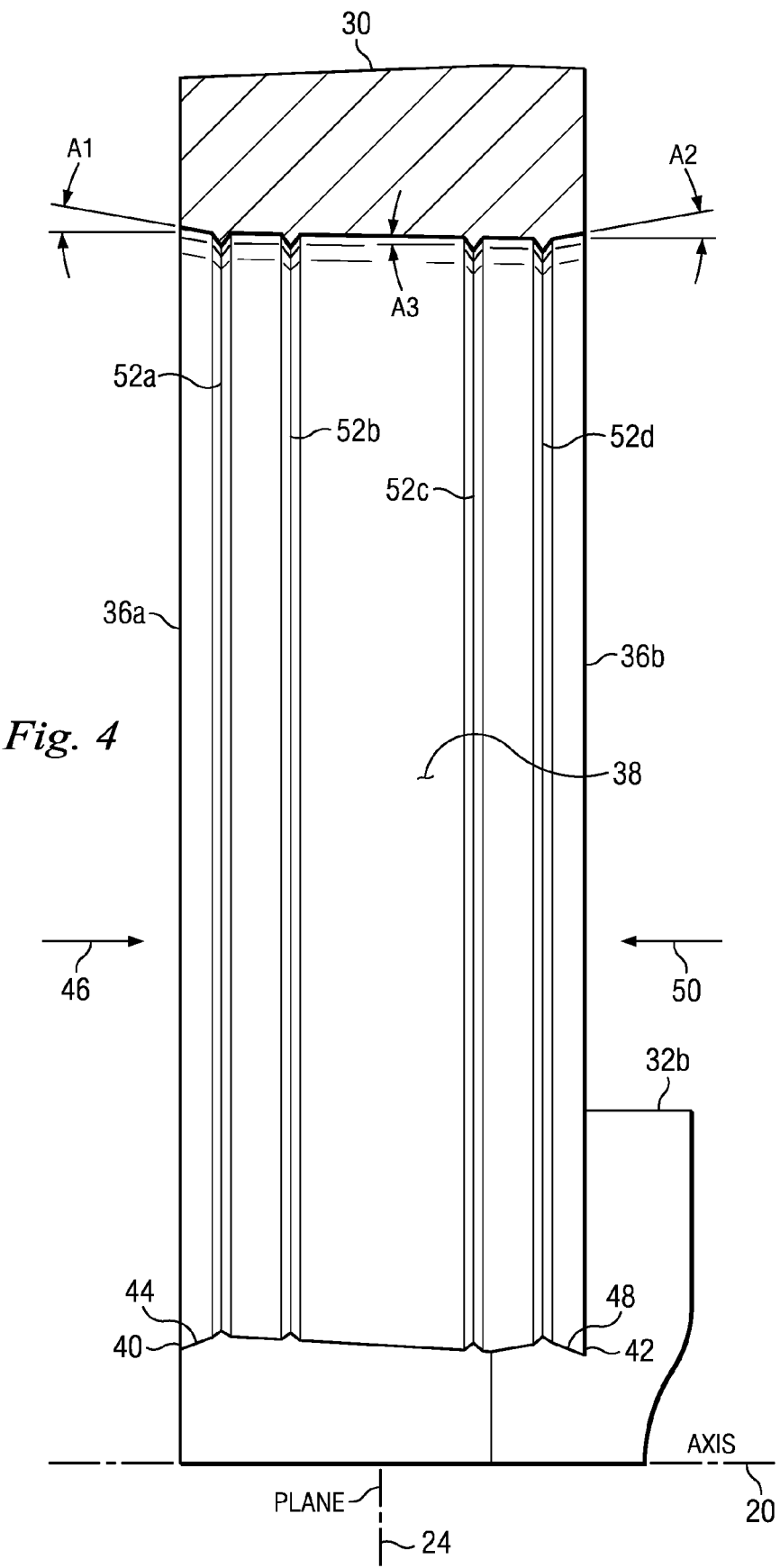
FIG. 4 is a section view taken along line 4-4 of FIG. 2, according to an exemplary embodiment.

In an exemplary embodiment, as illustrated in FIGS. 2, 3 and 4 with continuing reference to FIG. 1, the arcuate member 12a has an longitudinal axis 20, a transverse axis 22 that is perpendicular to the longitudinal axis 20, and a plane 24 in which the transverse axis 22 lies. The longitudinal axis 20 is perpendicular to the plane 24. The arcuate member 12a includes lugs 26a and 26b, which extend radially outwardly and are circumferentially-spaced. Axially-extending openings 28a and 28b are formed through the lugs 26a and 26b, respectively. In an exemplary embodiment, each of the openings 28a and 28b is a slot, as shown in FIG. 2. The lugs 26a and 26b extend radially outward from a circumferentially-extending outside surface 30, the center of curvature of which is located on the longitudinal axis 20.

Opposing ears 32a and 32b extend from the outside surface 30. At least respective portions of the ears 32a and 32b extend in opposing directions which are generally parallel to the transverse axis 22 and perpendicular to the longitudinal axis 20. Openings 34a and 34b extend through the ears 32a and 32b, respectively, in a direction that is generally parallel to the plane 24 and perpendicular to each of the axes 20 and 22. The openings 34a and 34b are linearly aligned, and a distance D1 (FIG. 3) is defined between the plane 24 and the openings 34a and 34b. The distance D1 extends between the plane 24 and the openings 34a and 34b in a direction that is parallel to the longitudinal axis 20. The distance D1 does not extend beyond the respective points on the ears 32a and 32b which are defined by the respective openings 34a and 34b and are closest to the plane 24. The distance D1 is greater than zero, for reasons to be described below.

As shown in FIG. 4, the outside surface 30 extends axially between axial end portions 36a and 36b. In an exemplary embodiment, the distance between the axial end portions 36a and 36b in a direction that is parallel to the longitudinal axis 20 is about 2 inches. In an exemplary embodiment, the distance between the axial end portions 36a and 36b in a direction that is parallel to the longitudinal axis 20 is 2.15 inches. A circumferentially-extending inside surface 38 also extends axially between the axial end portions 36a and 36b. The center of curvature of the inside surface 38 lies on the longitudinal axis 20. Opposing edges 40 and 42 extend circumferentially, along with the inside surface 38. The respective centers of curvature of the edges 40 and 42 lie on the longitudinal axis 20. A circumferentially-extending chamfer 44 is adjacent the edge 40. The center of curvature of the chamfer 44 lies on the longitudinal axis 20. The chamfer 44 extends axially away from the edge 40 in a direction that is generally parallel to the longitudinal axis 20, as indicated by an arrow 46 (FIG. 4). The axial extension of the chamfer 44 away from the edge 40 defines an angle A1. The angle A1 extends circumferentially from the longitudinal axis 20 to the chamfer 44 in any plane in which the longitudinal axis 20 lies. The vertex of the angle A1 is offset axially from the edge 40 in the direction indicated by the arrow 46. The angle A1 is less than 90 degrees. In an exemplary embodiment, the angle A1 ranges from about 10 degrees to about 15 degrees. In an exemplary embodiment, the angle A1 is about 10 degrees.

A circumferentially-extending chamfer 48 is adjacent the edge 42. The center of curvature of the chamfer 48 lies on the longitudinal axis 20. The chamfer 48 extends axially away from the edge 42 in a direction that is opposite to the direction indicated by the arrow 46 and thus is generally parallel to the longitudinal axis 20, as indicated by an arrow 50. The axial extension of the chamfer 48 away from the edge 42 defines an angle A2. The angle A2 extends circumferentially from the longitudinal axis 20 to the chamfer 48 in any plane in which the longitudinal axis 20 lies. The vertex of the angle A2 is offset axially from the edge 42 in the direction indicated by the arrow 50. The angle A2 is less than 90 degrees. In an exemplary embodiment, the angle A2 ranges from about 10 degrees to about 15 degrees. In an exemplary embodiment, the angle A2 is about 10 degrees.

A plurality of protrusions or ridges 52, namely ridges 52a, 52b, 52c and 52d, extend radially inwardly from the inside surface 38 so that the distal ends of the ridges 52a-52d are radially offset from the inside surface 38. The ridges 52a-52d are spaced axially in a parallel relation between the chamfers 44 and 48. The chamfer 44 extends axially in the direction 46 from the edge 40 to the proximal end portion of the ridge 52a. The chamfer 48 extends axially in the direction 50 from the edge 42 to the proximal end portion of the ridge 52d.

The inside surface 38 is tapered and thus an angle A3 is defined by the inside surface 38. The angle A3 extends circumferentially from the longitudinal axis 20 to the inside surface 38 in any plane in which the longitudinal axis 20 extends. The vertex of the angle A3 is offset axially from the edge 40 in the direction indicated by the arrow 46. In an exemplary embodiment, the angle A3 is greater than 0 degrees. In an exemplary embodiment, the angle A3 is greater than 0 degrees but less than about 10 degrees. In an exemplary embodiment, the angle A3 is about 1 degree.

In an exemplary embodiment, the arcuate members 12b, 14a and 14b are identical to the arcuate member 12a and therefore the arcuate members 12b, 14a and 14b will not be described in further detail. Parts and features of the arcuate members 12b, 14a, 14b corresponding to identical parts of the arcuate member 12a are given the same reference numerals.

Figure 5:
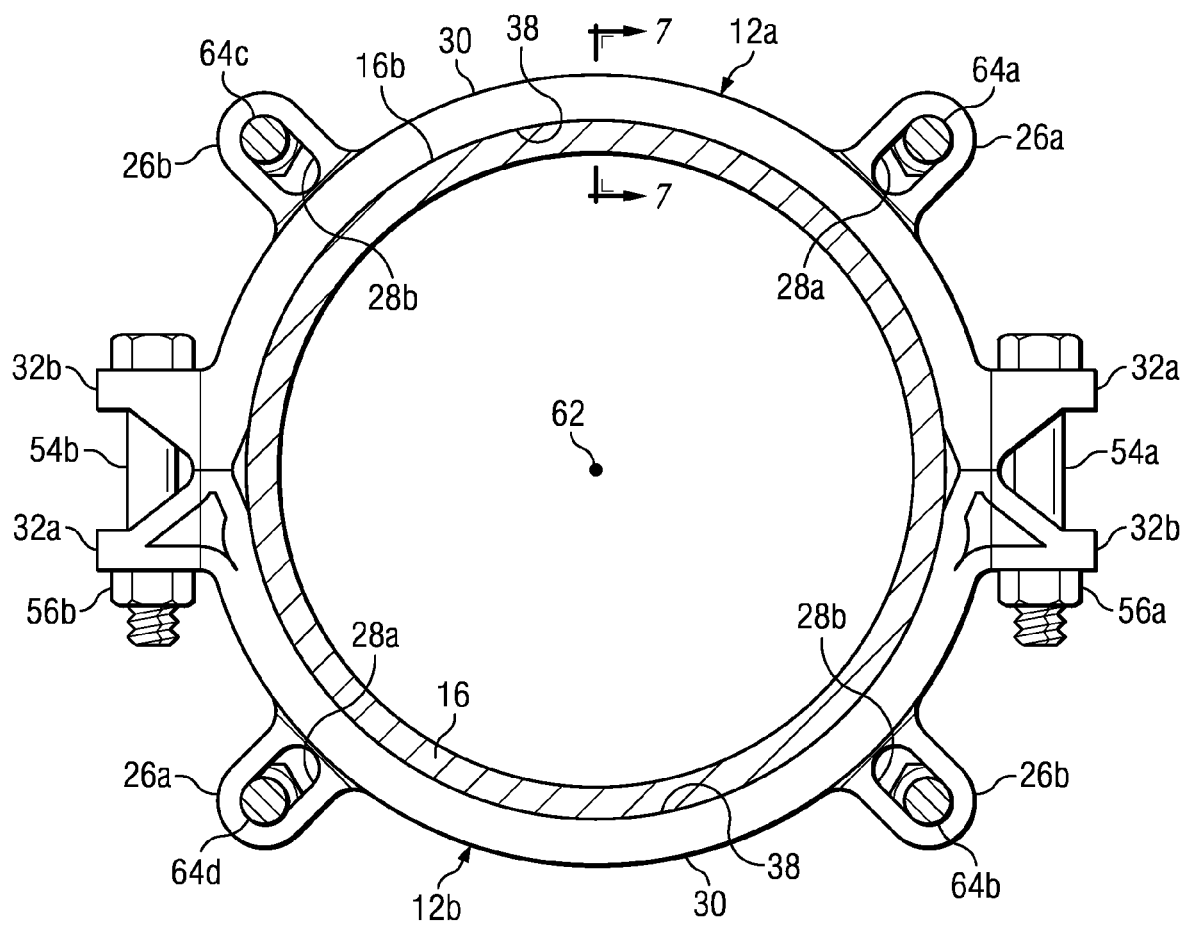
FIG. 5 is a section view taken along line 5-5 of FIG. 1, according to an exemplary embodiment.
Figure 6:
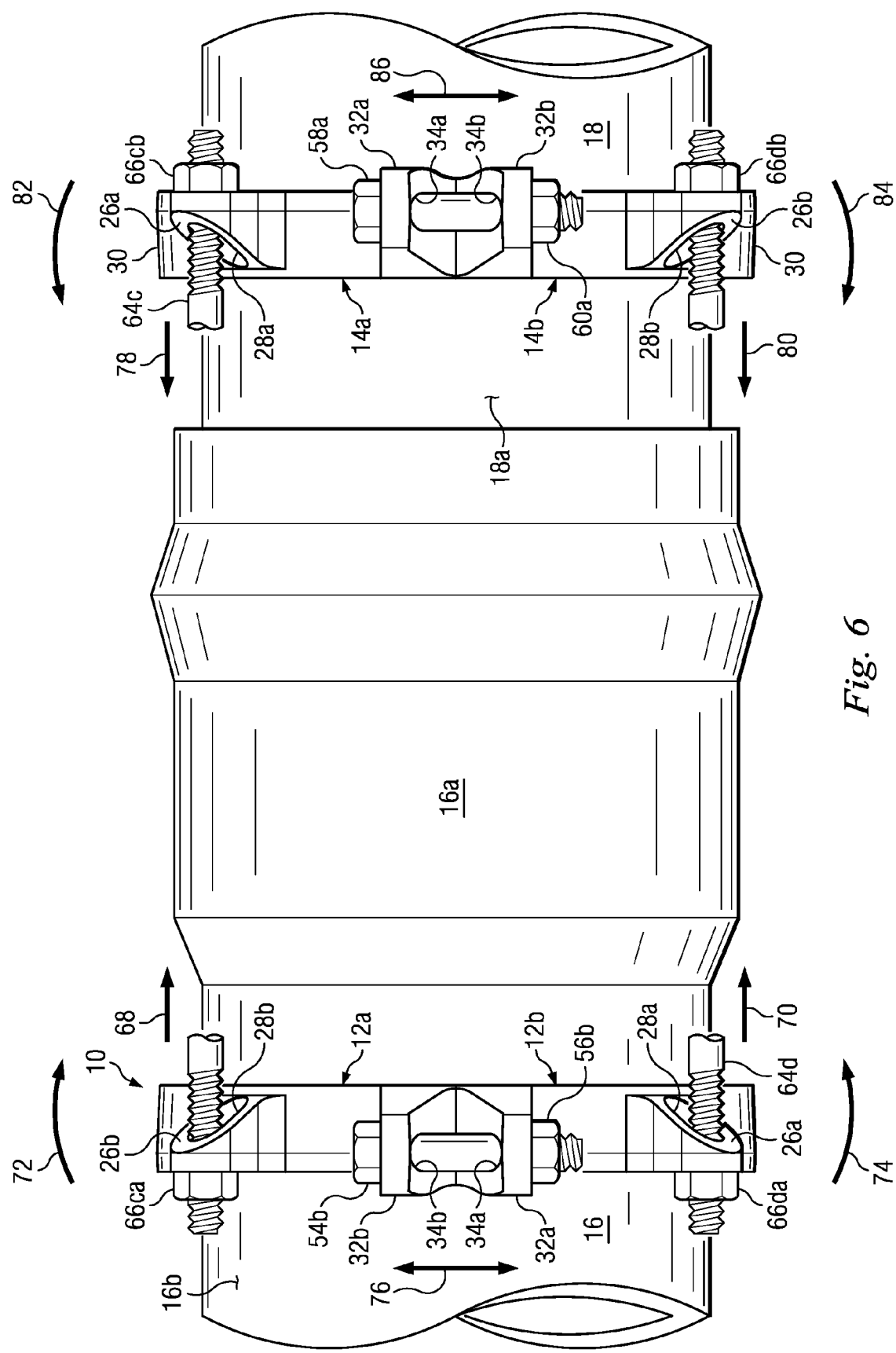
FIG. 6 is a left side elevational view of the apparatus of FIG. 1 clamped around the connected pipes, according to an exemplary embodiment.
Figure 7:
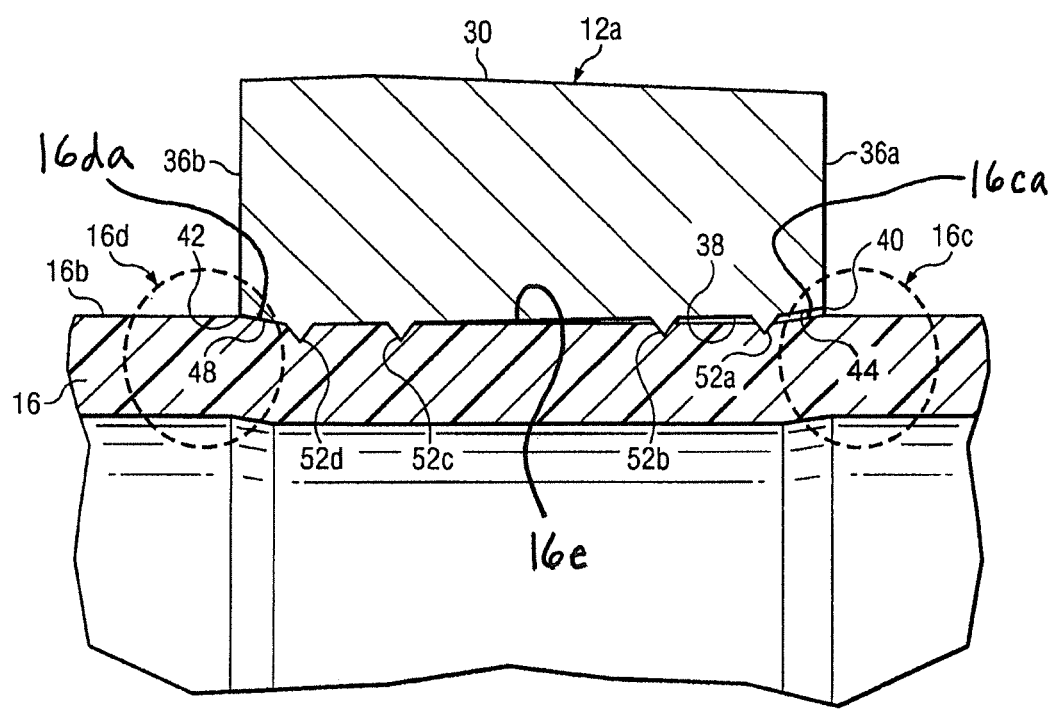
FIG. 7 is a section view taken along line 7-7 of FIG. 5, according to an exemplary embodiment.

In an exemplary embodiment, as illustrated in FIGS. 5, 6 and 7, as well as FIG. 1, with continuing reference to FIGS. 2-4, when the apparatus 10 is installed on the pipes 16 and 18, the arcuate members 12a and 12b envelop respective portions of, and are clamped onto, the pipe 16 (shown in FIGS. 1, 5 and 6), and the arcuate members 14a and 14b envelop respective portions of, and are clamped onto, the pipe 18 (shown in FIGS. 1 and 6).

More particularly, the arcuate members 12a and 12b extend about respective portions of an outside surface 16b of the pipe 16 so that the respective inside surfaces 38 of the arcuate members 12a and 12b engage respective portions of the outside surface 16b. The opening 34a of the arcuate member 12a is axially aligned with the opening 34b of the arcuate member 12b, and a fastener 54a extends through the axially aligned openings 34a and 34b. A nut 56a is threadably engaged with the fastener 54a to thereby connect the arcuate members 12a and 12b. The opening 34b of the arcuate member 12a is axially aligned with the opening 34a of the arcuate member 12b, and a fastener 54b extends through the axially aligned openings 34b and 34a. A nut 56b is threadably engaged with the fastener 54b to thereby connect the arcuate members 12a and 12b. The nuts 56a and 56b continue to be threadably engaged with the fasteners 54a and 54b, respectively, and are tightened against the ears 32b and 32a, respectively, of the arcuate member 12b, thereby tightening the fasteners 54a and 54b against the ears 32a and 32b, respectively, of the arcuate member 12a, and thus clamping the arcuate members 12a and 12b onto the pipe 16. As a result of the clamping of the arcuate members 12a and 12b onto the pipe 16, the ridges 52a-52d of the arcuate member 12a penetratingly engage the outside surface 16b of the pipe 16, as shown in FIG. 7. And the corresponding ridges 52a-52d of the arcuate member 12b penetratingly engage the outside surface 16b of the pipe 16.

Likewise, the arcuate members 14a and 14b extend about respective portions of an outside surface 18a of the pipe 18 so that the respective inside surfaces 38 of the arcuate members 14a and 14b engage respective portions of the outside surface 18a. The opening 34a of the arcuate member 14a is axially aligned with the opening 34b of the arcuate member 14b, and a fastener 58a extends through the axially aligned openings 34a and 34b. A nut 60a is threadably engaged with the fastener 58a to thereby connect the arcuate members 14a and 14b. The opening 34b of the arcuate member 14a is axially aligned with the opening 34a of the arcuate member 14b, and a fastener 58b extends through the axially aligned openings 34b and 34a. A nut 60b is threadably engaged with the fastener 58b to thereby connect the arcuate members 14a and 14b. The nuts 60a and 60b continue to be threadably engaged with the fasteners 58a and 58b, respectively, and are tightened against the ears 32b and 32a, respectively, of the arcuate member 14b, thereby tightening the fasteners 58a and 58b against the ears 32a and 32b, respectively, of the arcuate member 14a, and thus clamping the arcuate members 14a and 14b onto the pipe 18. As a result of the clamping of the arcuate members 14a and 14b onto the pipe 18, the respective pluralities of ridges 52 of the arcuate members 14a and 14b penetratingly engage the outside surface 18a of the pipe 18.

As shown in FIG. 5, the pipe 16 defines a longitudinal center axis 62, which is coaxial with respective longitudinal axes 20 of the arcuate members 12a, 12b, 14a and 14b when the arcuate members 12a and 12b are clamped onto the pipe 16 and the arcuate members 14a and 14b are clamped onto the pipe 18. In several exemplary embodiments, when the arcuate members 12a and 12b are clamped onto the pipe 16, the respective longitudinal axes 20 thereof are coaxial, the respective transverse axes 22 thereof are coaxial, and the respective planes 24 thereof are coplanar. Likewise, in several exemplary embodiments, when the arcuate members 14a and 14b are clamped onto the pipe 18, the respective longitudinal axes 20 thereof are coaxial, the respective transverse axes 22 thereof are coaxial, and the respective planes 24 thereof are coplanar.

As shown in FIGS. 1, 5 and 6, the opening 28a of the arcuate member 12a is axially aligned with the opening 28b of the arcuate member 14a, and a tie rod 64a extends through the axially-aligned openings so that the tie rod 64a is in a generally parallel relation with the longitudinal axis 62. Nuts 66aa and 66ab are threadably engaged with the opposing end portions, respectively, of the tie rod 64a, thereby connecting the arcuate members 12a and 12b to the arcuate members 14a and 14b. Similarly, the opening 28b of the arcuate member 12b is axially aligned with the opening 28a of the arcuate member 14b, and a tie rod 64b extends through the axially-aligned openings so that the tie rod 64b is in a generally parallel relation with the longitudinal axis 62. Nuts 66ba and 66bb are threadably engaged with the opposing end portions, respectively, of the tie rod 64b, thereby connecting the arcuate members 12a and 12b to the arcuate members 14a and 14b. The opening 28b of the arcuate member 12a is axially aligned with the opening 28a of the arcuate member 14a, and a tie rod 64c extends through the axially-aligned openings so that the tie rod 64c is in a generally parallel relation with the longitudinal axis 62. Nuts 66ca and 66cb are threadably engaged with the opposing end portions, respectively, of the tie rod 64c, thereby connecting the arcuate members 12a and 12b to the arcuate members 14a and 14b. The opening 28a of the arcuate member 12b is axially aligned with the opening 28b of the arcuate member 14b, and a tie rod 64d extends through the axially-aligned openings so that the tie rod 64d is in a generally parallel relation with the longitudinal axis 62. Nuts 66da and 66db are threadably engaged with the opposing end portions, respectively, of the tie rod 64d, thereby connecting the arcuate members 12a and 12b to the arcuate member 14a and 14b.

In operation, in an exemplary embodiment, with continuing reference to FIGS. 1-7, the pipes 16 and 18 form a fluid-transporting pipeline so that the pipes 16 and 18 are subject to an internal fluid pressure. This pressurization within each of the pipes 16 and 18, along with any forces present due to system-level or environmental conditions, result in forces being applied to the connection between the spigot of the pipe 18 and the bell 16a of the pipe 16 which, in turn, urge the pipes 16 and 18 to axially separate or pull apart from each other.

However, the apparatus 10 restrains or prevents the pipe 18 from appreciably moving axially relative to, or separating from, the pipe 16, and vice versa. The clamping of the arcuate members 12a and 12b onto the pipe 16, and the penetrating engagement of the respective ridges 52a-52d of the arcuate members 12a and 12b into the outside surface 16b of the pipe 16, prevent the arcuate members 12a and 12b from moving axially relative to the pipe 16. Likewise, the clamping of the arcuate members 14a and 14b onto the pipe 18, and the penetrating engagement of the respective ridges 52a-52d of the arcuate members 14a and 14b into the outside surface 18a of the pipe 18, prevent the arcuate members 14a and 14b from moving axially relative to the pipe 18. Further, the clamping forces generated by the threaded engagements of the tie rods 64a, 64b, 64c and 64d with the nuts 66aa and 66ab, 66ba and 66bb, 66ca and 66cb, and 66da and 66db, respectively, and applied to each corresponding lug 26a or 26b, prevent the arcuate members 12a and 12b from moving axially relative to the arcuate members 14a and 14b, and vice versa. Since the arcuate members 12a and 12b, and 14a and 14b, are prevented from moving relative to the pipes 16 and 18, respectively, and from moving relative to each other, the pipes 16 and 18 are therefore prevented from appreciably moving relative to, and axially separating from, one another.

During operation, in an exemplary embodiment, a risk of shear failure is generated in a circumferentially-extending portion 16c (FIG. 7) of the pipe 16 located at or near the axial end portion 36a of the arcuate member 12a. The portion 16c includes a transition region 16ca of the pipe 16 located between a compression region 16e under the arcuate member 12a and the "free to expand" region of the pipe 16 adjacent the axial end portion 36a of the arcuate member 12a. The risk of shear failure in the portion 16c is generated in whole or in part as a result of the above-described pressurization within the pipe 16. However, the chamfer 44 relieves the portion 16c of shear, that is, the chamfer 44 reduces the risk of shear failure in the portion 16c of the pipe 16.

Likewise, a risk of shear failure is generated in a circumferentially-extending portion 16d (FIG. 7) of the pipe 16 located at or near the axial end portion 36b of the arcuate member 12a. The portion 16d includes a transition region 16da of the pipe 16 located between the region of a compression region 16e under the arcuate member 12a and the "free to expand" region of the pipe 16 adjacent the axial end portion 36b of the arcuate member 12a. The risk of shear failure in the portion 16d is generated in whole or in part as a result of the above-described pressurization within the pipe 16. However, the chamfer 48 relieves the portion 16d of shear, that is, the chamfer 48 reduces the risk of shear failure in the portion 16d of the pipe 16.

In like manner, the respective chamfers 44 and 48 of each of the arcuate members 12b, 14a and 14b also operate to reduce the risk of shear failure in corresponding portions of the pipe 16 or 18.

In an exemplary embodiment, as shown in FIG. 6, as a result of the above-described restraining operation of the apparatus 10, axial forces are applied to the lugs 26a and 26b of each of the arcuate members 12a and 12b. These axial forces are directed towards the arcuate members 14a and 14b, as indicated by arrows 68 and 70 in FIG. 6. As a result of these axial forces, the arcuate members 12a and 12b are urged to fold towards one another and against the pipe 16, thereby undergoing a butterfly effect. That is, the arcuate members 12a and 12b bend against the pipe 16 and about an axis that is the same as, or generally parallel to, the transverse axis 22 of the arcuate member 12a, as indicated by arrows 72 and 74 in FIG. 6. The arcuate members 12a and 12b are urged to fold in the circumferential directions indicated by the arrows 72 and 74, respectively. As a result, the fasteners 54a and 54b are placed in bending, which bending urges the fasteners 54a and 54b to bend about an axis that is the same as, or generally parallel to, the transverse axis 22 of the arcuate member 12a, as indicated by the arrows 72 and 74 in FIG. 6. In particular, the respective upper portions of the fasteners 54a and 54b are urged to bend in the circumferential direction indicated by the arrow 72, and the respective lower portions of the fasteners 54a and 54b are urged to bend in the opposite circumferential direction indicated by the arrow 74. In addition to being placed in bending, the fasteners 54a and 54b are also placed in tension, as indicated by arrow 76 in FIG. 6.

However, although the fasteners 54a and 54b are urged to bend, the respective axial offsets of the openings 34a and 34b by the distance D1 resist the degree to which the fasteners 54a and 54b are placed in bending. Since the distance D1 is greater than zero, it is ensured that the respective portions of the fasteners 54a and 54b that extend through the openings 34a and 34b of each of the arcuate members 12a and 12b are always offset from the plane 24, thereby facilitating the resistance to bending. In several exemplary embodiments, bending in each of the fasteners 54a and 54b is resisted to such a degree that any bending in the fasteners 54a and 54b is eliminated or nearly eliminated, and thus the fasteners 54a and 54b are only placed in tension, as indicated by the arrow 76.

Likewise, axial forces are applied to the lugs 26a and 26b of each of the arcuate members 14a and 14b. These axial forces are directed towards the arcuate members 12a and 12b, as indicated by arrows 78 and 80 in FIG. 6. As a result of these axial forces, the arcuate members 14a and 14b are urged to fold towards one another and against the pipe 18, thereby undergoing a butterfly effect. That is, the arcuate members 14a and 14b bend against the pipe 18 and about an axis that is the same as, or generally parallel to, the transverse axis 22 of the arcuate member 14a, as indicated by arrows 82 and 84 in FIG. 6. The arcuate members 14a and 14b are urged to fold in the circumferential directions indicated by the arrows 82 and 84, respectively. As a result, the fasteners 58a and 58b are placed in bending, which bending urges the fasteners 58a and 58b to bend about an axis that is the same as, or generally parallel to, the transverse axis 22 of the arcuate member 14a, as indicated by the arrows 82 and 84 in FIG. 6. In particular, the respective upper portions of the fasteners 58a and 58b are urged to bend in the circumferential direction indicated by the arrow 82, and the respective lower portions of the fasteners 58a and 58b are urged to bend in the opposite circumferential direction indicated by the arrow 84. In addition to being placed in bending, the fasteners 58a and 58b are also placed in tension, as indicated by arrow 86 in FIG. 6.

However, although the fasteners 58a and 58b are urged to bend, the respective axial offsets of the openings 34a and 34b by the distance D1 resist the degree to which the fasteners 58a and 58b are placed in bending. Since the distance D1 is greater than zero, it is ensured that the respective portions of the fasteners 58a and 58b that extend through the openings 34a and 34b of each of the arcuate members 14a and 14b are always offset from the plane 24, thereby facilitating the resistance to bending. In several exemplary embodiments, bending in each of the fasteners 58a and 58b is resisted to such a degree that any bending is eliminated or nearly eliminated, and thus the fasteners 58a and 58b are only placed in tension, which tension is indicated by the arrow 86.

Additionally, as the pressure-induced forces indicated by the arrows 68 and 70 increase, the tapering of the respective inside surfaces 38 of the arcuate members 12a and 12b, by the respective angles A3, also resists the degree to which the fasteners 54*a* and 54*b* are placed in the bending indicated by the arrows 72 and 74. In addition to resisting bending as the pressure-induced forces indicated by the arrows 68 and 70 increase, the tapering of the respective inside surfaces 38 of the arcuate members 12*a* and 12*b*, by the respective angles A3, also automatically increases the degree to which the respective pluralities of ridges 52 of the arcuate members 12*a* and 12*b* penetratingly engage the outside surface 16*b* of the pipe 16, thereby further inhibiting any axial separation of the pipes 16 and 18.

Likewise, the tapering of the respective inside surfaces 38 of the arcuate members 14*a* and 14*b*, by the respective angles A3, also resists the degree to which the fasteners 58*a* and 58*b* are placed in the bending indicated by the arrows 82 and 84. In addition to resisting bending as the pressure-induced forces indicated by the arrows 78 and 80 increase, the respective angles A3 of the respective inside surfaces 38 of the arcuate members 14*a* and 14*b* also automatically increase the degree to which the respective pluralities of ridges 52 of the arcuate members 14*a* and 14*b* penetratingly engage the outside surface 18*a* of the pipe 18, thereby further inhibiting any axial separation of the pipes 16 and 18.

In an exemplary embodiment, the pipe 16 or 18 is made out of PVC, and meets AWWA C900, which is a standard from the American Water Works Association (AWWA). In an exemplary embodiment, the dimension ratio (DR) of the pipe 16 or 18, that is, the ratio of the outside diameter of the pipe 16 or 18 to the radial wall thickness of the pipe 16 or 18, is 14, 18 or 25 when the nominal pipe size ranges from about 4 inches (100 mm) through 12 inches (30 mm). In an exemplary embodiment, the minimum factor of safety of the pipe 16 or 18 is 2.0. In an exemplary embodiment, the DR of the pipe 16 or 18 is 18 and the pipe is rated at 235 psi. In an exemplary embodiment, the pipe 16 or 18 is rated at 235 psi and the nominal pipe size is 4, 6, 8, or 12 inches.

In an exemplary embodiment, the pipe 16 or 18 is made out of molecularly oriented polyvinylchloride (PVCO), and meets AWWA C909, which is another AWWA standard. In an exemplary embodiment, the pipe 16 or 18 is made out of PVCO, meets AWWA C909, and is rated at 235 psi.

In an exemplary embodiment, the arcuate members 12*a*, 12*b*, 14*a* and 14*b* are made out of ASTM A536 ductile iron.

Figure 8:
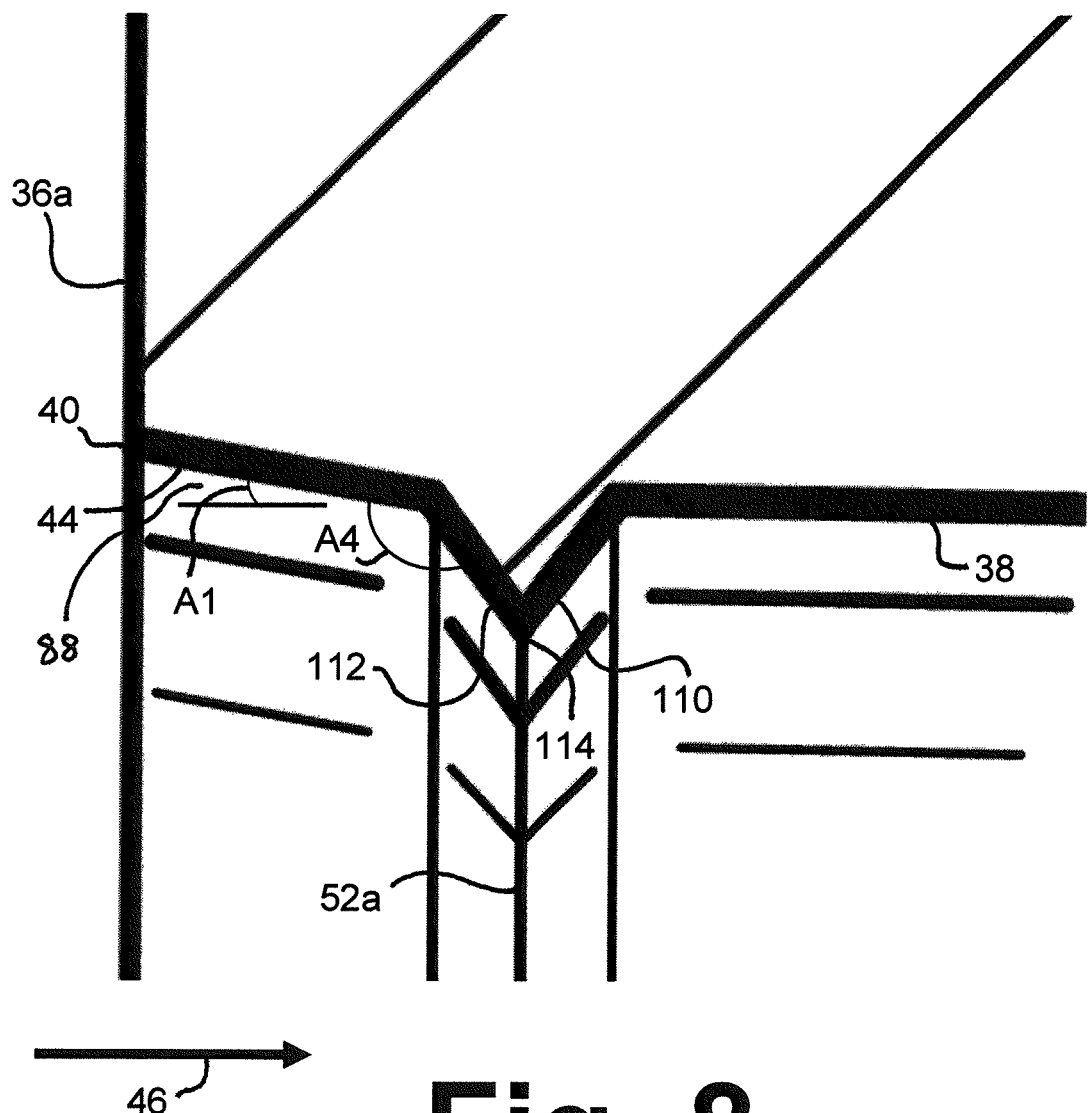
FIG. 8 is an enlarged view of a portion of FIG. 4.
Figure 9:
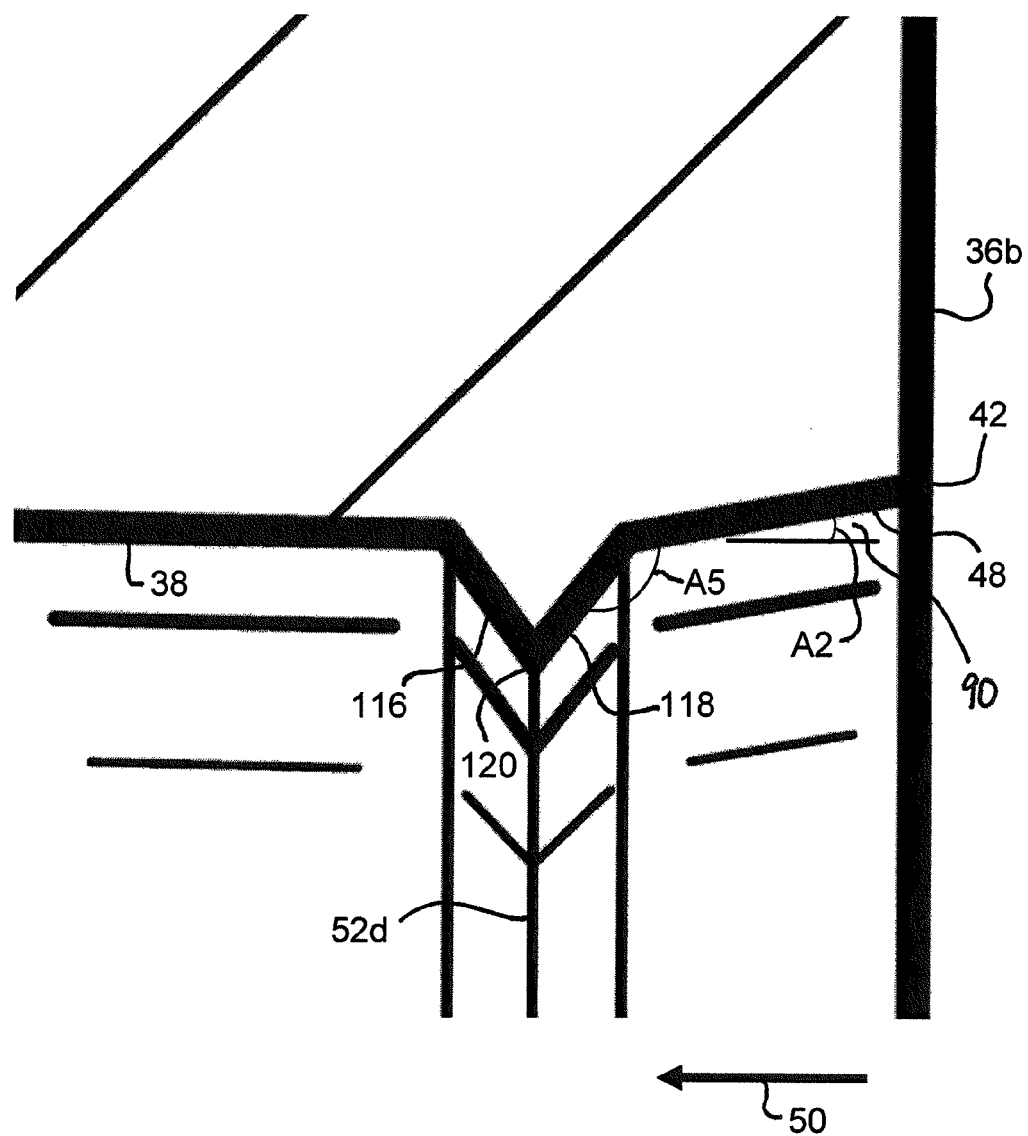
FIG. 9 is an enlarged view of another portion of FIG. 4.

Referring to FIG. 8, the ridge 52*a* extends radially inwardly from the circumferentially-extending inside surface 38. The ridge 52*a* includes a first angularly-extending interior ridge face 110; a first angularly-extending exterior ridge face 112 positioned between the first angularly-extending interior ridge face 110 and the axial end portion 36*a*; and a first distal end in the form of a first peak 114 defined by the joinder of the first angularly-extending interior ridge face 110 and the first angularly-extending exterior ridge face 112, wherein the first distal end in the form of the first peak 114 is radially offset from the circumferentially-extending inside surface 38. Referring to FIG. 9, the ridge 52*d* extends radially inwardly from the circumferentially-extending inside surface 38. The ridge 52*d* includes a second angularly-extending interior ridge face 116; a second angularly-extending exterior ridge face 118 positioned between the second angularly-extending interior ridge face 116 and the axial end portion 36*b*; and a second distal end in the form of a second peak 120 defined by the joinder of the second angularly-extending interior ridge face 116 and the second angularly-extending exterior ridge face 118, wherein the second distal end in the form of the second peak 120 is radially offset from the circumferentially-extending inside surface 38. As shown in FIG. 4, the ridges 52*a* and 52*d* are spaced axially in a parallel relation between the chamfers 44 and 48. Referring to FIG. 8, the chamfer 44 extends axially in the direction indicated by the arrow 46 from the edge 40 and intersects with the first angularly-extending exterior ridge face 112 of the ridge 52*a*. A first intersection angle A4 is defined by the intersection between the chamfer 44 and the first angularly-extending exterior ridge face 112 of the ridge 52*a*, the first intersection angle A4 being less than 180 degrees, the first intersection angle A4 being greater than the sum of the angle A and 90 degrees. Referring to FIG. 9, the chamfer 48 extends axially in the direction indicated by the arrow 50 from the edge 42 and intersects with the second angularly-extending exterior ridge face 118 of the ridge 52*d*. A second intersection angle A5 is defined by the intersection between the chamfer 48 and the second angularly-extending exterior ridge face 118 of the ridge 52*d*, the second intersection angle A5 being less than 180 degrees, the second intersection angle A5 being greater than the sum of the chamfer angle A2 and 90 degrees.

As shown in FIGS. 8 and 9, the chamfers 44 and 48 define zones 88 and 90, respectively. The zone 88 is shown in FIG. 8, and the zone 90 is shown in FIG. 9. The apparatus 10 is configured so that the compression region 16*e* (FIG. 7) is defined under each of the arcuate members 12*a* and 12*b* when the arcuate members 12*a* and 12*b* are connected together, clamped onto the pipe 16, and extend about the respective portions of the outside surface 16*b* of the pipe 16, and so that transition regions 16*ca* and 16*da* of the pipe 16 are permitted to expand into the zones 88 and 90, respectively, when the arcuate members 12*a* and 12*b* are connected together, clamped onto the pipe 16, and extend about the respective portions of the outside surface 16*b* of the pipe 16, and the pipe 16 is subjected to an internal fluid pressurization. The expansion of the transition region 16*ca* into the zone 88 is shown in FIG. 7. Further, the expansion of the transition region 16*da* into the zone 90 is shown in FIG. 7. Still further, as shown in FIG. 7, the transition region 16*ca* of the pipe 16 is adjacent the axial end portion 36*a*, and is located axially between the compression region 16*e* and the axial end portion 36*a*. Yet still further, as shown in FIG. 7, the transition region 16*da* of the pipe 16 is adjacent the axial end portion 36*b*, and is located axially between the compression 16*e* and the axial end portion 36*b*.

In several exemplary embodiments, variations may be made in the foregoing. For example, only one pair of arcuate members 12*a* and 12*b*, or 14*a* and 14*b*, may include the ridges 52*a*-52*d*. Further, instead of connecting the pair of arcuate members 12*a* and 12*b* to another pair of identical arcuate members such as the arcuate members 14*a* and 14*b*, the pair of arcuate members 12*a* and 12*b* could be connected to other types of restrained sleeve pipe couplings and/or end rings. Still further, the pair of arcuate members 12*a* and 12*b* could be employed in conjunction with a conventional flanged connection between a pipe having a flange and a pipe having a plain end. The arcuate members 12*a* and 12*b* could be clamped together around the pipe having the plain end in a manner described above, and the tie rods 64*a*-64*d* could extend from the arcuate members 12*a* and 12*b* and through bores formed in the flange. The nuts 66*ab*, 66*bb*, 66*cb* and 66*db* could then be threadably engaged with the tie rods 64*a*, 64*b*, 64*c* and 64*d*, respectively, to apply clamping forces to the flange and promote a flanged connection that is more resistive to any forces tending to separate the pipes. The flanged connection may be between straight pipe sections, curved pipe sections, etc. or any combination thereof. In several exemplary embodiments, the pair of arcuate members 12*a* and 12*b*, or 14*a* and 14*b*, may be clamped around any pipe in any type of application where it is desired to form a ring around the pipe and maintain the as-installed position of the arcuate members relative to the pipe, notwithstanding the subsequent subjection of the installed arcuate members, or ring, to various static and/or dynamic loads in various directions. The quantity and spacing of the lugs 26a and 26b and any corresponding tie rods may be varied. The pipes 12 and 14 may be made of other material such as, for example, high-density polyethylene. The pipes 12 and 14 may be made of many different types of materials having widely varying material hardness levels. In addition to the employment of ears, fasteners and nuts, the arcuate members 12a and 12b, and 14a and 14b, may be connected using clamps, adhesives, welded joints, brazed joints, etc. The number of ridges 52 extending from the inside surface 38 may be varied. Further, the size, shape, location, spacing and cross-sectional profile of the ridges 52a-52d may be varied. For example, the ridges 52a-52d may have rectangular, triangular or arcuate cross-sections, or any combination thereof. In addition to the above-described spigot-and-bell and flanged connections, the apparatus 10, or the arcuate member 12a, 12b, 14a or 14b, may be used with other types of pipe connections. In addition to tie rods and nuts, other devices may be employed to connect the pair of arcuate members 12a and 12b to the pair of arcuate members 14a and 14b such as, for example, cables and turnbuckles, bolts, etc. or any combination thereof.

An apparatus adapted to engage a pipe has been described that includes a first arcuate member, wherein the first arcuate member has a first axis, a second axis that is perpendicular to the first axis, and a first plane in which the second axis lies and to which the first axis is perpendicular, and wherein the first arcuate member includes a circumferentially-extending first inside surface adapted to engage the outside surface of the pipe, wherein the center of curvature of the first inside surface lies on the first axis; a circumferentially-extending first edge, wherein the center of curvature of the first edge lies on the first axis; and a circumferentially-extending first chamfer adjacent the first edge, wherein the center of curvature of the first chamfer lies on the first axis, wherein the first chamfer extends axially away from the first edge in a first axial direction and axially between the first edge and the first inside surface, wherein the axial extension of the first chamfer defines a first angle, the first angle extending circumferentially from the first axis to the first chamfer in any plane in which the first axis extends, wherein the vertex of the first angle is offset axially from the first edge in the first axial direction, and wherein the first angle is less than 90 degrees. In an exemplary embodiment, the first chamfer reduces a risk of shear failure in the pipe when the first inside surface of the first arcuate member engages the outside surface of the pipe and the pipe is subject to internal pressurization. In an exemplary embodiment, the first angle ranges from about 10 degrees to about 15 degrees. In an exemplary embodiment, the first angle is about 10 degrees. In an exemplary embodiment, the first arcuate member further includes a circumferentially-extending second edge, wherein the center of curvature of the second edge lies on the first axis; and a circumferentially-extending second chamfer adjacent the second edge, wherein the center of curvature of the second chamfer lies on the first axis, wherein the second chamfer extends axially away from the second edge in a second axial direction and axially between the second edge and the first inside surface, wherein the second axial direction is opposite the first axial direction, wherein the axial extension of the second chamfer defines a second angle, the second angle extending circumferentially from the first axis to the second chamfer in any plane in which the first axis extends, wherein the vertex of the second angle is offset axially from the second edge in the second axial direction, wherein the second angle is less than 90 degrees, and wherein the first inside surface extends axially between the first and second chamfers. In an exemplary embodiment, the second angle is equal to, or different than, the first angle. In an exemplary embodiment, each of the first and second angles ranges from about 10 degrees to about 15 degrees. In an exemplary embodiment, each of the first and second angles is about 10 degrees. In an exemplary embodiment, the first inside surface defines a second angle, wherein the second angle extends circumferentially from the first axis to the first inside surface in any plane in which the first axis extends, and wherein the vertex of the second angle is offset axially from the first edge in the first axial direction. In an exemplary embodiment, the second angle is about 1 degree. In an exemplary embodiment, the first arcuate member further includes an ear, at least a portion of which extends away from the first inside surface in a direction that is generally parallel to the second axis and perpendicular to the first axis; and an opening through which a fastener is adapted to extend, the opening extending through the portion of the ear in a direction that is generally perpendicular to each of the first and second axes; wherein a distance in a direction that is parallel to the first axis is defined between the first plane and the opening; and wherein the distance is greater than zero. In an exemplary embodiment, the first arcuate member further includes a plurality of ridges extending radially inwardly from the first inside surface; wherein the ridges are spaced axially in a parallel relation. In an exemplary embodiment, the apparatus includes a second arcuate member, wherein the second arcuate member has a third axis, a fourth axis that is perpendicular to the third axis, and a second plane in which the fourth axis lies and to which the third axis is perpendicular, and wherein the second arcuate member includes a circumferentially-extending second inside surface adapted to engage the outside surface of the pipe, wherein the center of curvature of the second inside surface lies on the third axis; a circumferentially-extending second edge, wherein the center of curvature of the second edge lies on the third axis; and a circumferentially-extending second chamfer adjacent the second edge, wherein the center of curvature of the second chamfer lies on the third axis, wherein the second chamfer extends axially away from the second edge in a second axial direction and axially between the second edge and the second inside surface, wherein the axial extension of the second chamfer defines a second angle, the second angle extending circumferentially from the third axis to the second chamfer in any plane in which the third axis extends, wherein the vertex of the second angle is offset axially from the second edge in the second axial direction, and wherein the second angle is less than 90 degrees; wherein, when the first and second inside surfaces of the first and second arcuate members, respectively, engage the outside surface of the pipe: the first and third axes are either generally coaxial with, or generally parallel to, one another; the second and fourth axes are either generally coaxial with, or generally parallel to, one another; the first and second planes are generally coplanar; and the second axial direction is the same as the first axial direction. In an exemplary embodiment, the first arcuate member further includes a first ear, at least a portion of which extends away from the first inside surface in a direction that is generally parallel to the second axis and perpendicular to the first axis; and a first opening through which a fastener is adapted to extend, the first opening extending through the portion of the first ear in a direction that is generally perpendicular to each of the first and second axes; wherein a first distance in a direction that is parallel to the first axis is defined between the first plane and the first opening; and wherein the first distance is greater than zero; wherein the second arcuate member further includes a second ear, at least a portion of which extends away from the second inside surface in a direction that is generally parallel to the fourth axis and perpendicular to the third axis; and a second opening through which the fastener is adapted to extend, the second opening extending through the portion of the second ear in a direction that is generally perpendicular to each of the third and fourth axes; wherein a second distance in a direction that is parallel to the third axis is defined between the second plane and the second opening; and wherein the second distance is greater than zero; and wherein, when the first and second inside surfaces of the first and second arcuate members, respectively, engage the outside surface of the pipe, the first and second openings are coaxial and the fastener is permitted to extend through the coaxial first and second openings.

An apparatus adapted to engage a pipe has been described that includes a first arcuate member, wherein the first arcuate member has a first axis, a second axis that is perpendicular to the first axis, and a first plane in which the second axis lies and to which the first axis is perpendicular, and wherein the first arcuate member includes a circumferentially-extending first inside surface adapted to engage the outside surface of the pipe, wherein the center of curvature of the first inside surface lies on the first axis; a circumferentially-extending first edge, wherein the center of curvature of the first edge lies on the first axis; and a circumferentially-extending first chamfer adjacent the first edge, wherein the center of curvature of the first chamfer lies on the first axis, wherein the first chamfer extends axially away from the first edge in a first axial direction and axially between the first edge and the first inside surface, wherein the axial extension of the first chamfer defines a first angle, the first angle extending circumferentially from the first axis to the first chamfer in any plane in which the first axis extends, wherein the vertex of the first angle is offset axially from the first edge in the first axial direction, and wherein the first angle is less than 90 degrees; a circumferentially-extending second edge, wherein the center of curvature of the second edge lies on the first axis; and a circumferentially-extending second chamfer adjacent the second edge, wherein the center of curvature of the second chamfer lies on the first axis, wherein the second chamfer extends axially away from the second edge in a second axial direction and axially between the second edge and the first inside surface, wherein the second axial direction is opposite the first axial direction, wherein the axial extension of the second chamfer defines a second angle, the second angle extending circumferentially from the first axis to the second chamfer in any plane in which the first axis extends, wherein the vertex of the second angle is offset axially from the second edge in the second axial direction, wherein the second angle is less than 90 degrees, and wherein the first inside surface extends axially between the first and second chamfers; an ear, at least a portion of which extends away from the first inside surface in a direction that is generally parallel to the second axis and perpendicular to the first axis; an opening through which a fastener is adapted to extend, the opening extending through the portion of the ear in a direction that is generally perpendicular to each of the first and second axes, wherein a distance in a direction that is parallel to the first axis is defined between the first plane and the opening, and wherein the distance is greater than zero; and a plurality of ridges extending radially inwardly from the first inside surface, wherein the ridges are spaced axially in a parallel relation between the first and second chamfers; wherein the first inside surface defines a third angle; wherein the third angle extends circumferentially from the first axis to the first inside surface in any plane in which the first axis extends; and wherein the vertex of the third angle is offset axially from the first edge in the first axial direction.

A method has been described that includes providing a first arcuate member, the first arcuate member including a circumferentially-extending first inside surface and a first ridge extending radially inwardly therefrom, wherein the first inside surface extends axially between first and second axial end portions of the first arcuate member; clamping the first arcuate member onto a pipe so that the first ridge penetratingly engages the outside surface of the pipe; and reducing a risk of shear failure in a first portion of the pipe, wherein the first portion is located at or near the first axial end portion of the first arcuate member. In an exemplary embodiment, the risk of shear failure is generated in whole or in part as a result of pressurization within the pipe. In an exemplary embodiment, the method includes automatically increasing the degree to which the ridge penetratingly engages the outside surface of the pipe in response to the pressurization within the pipe. In an exemplary embodiment, the method includes reducing a risk of shear failure in a second portion of the pipe, wherein the second portion of the pipe is located at or near the second axial end portion of the first arcuate member. In an exemplary embodiment, the method includes providing a second arcuate member, the second arcuate member including a circumferentially-extending second inside surface and a second ridge extending radially inwardly therefrom; wherein clamping the first arcuate member onto the pipe includes connecting the second arcuate member to the first arcuate member; and wherein, in response to connecting the second arcuate member to the first arcuate member to thereby clamp the first arcuate member onto the pipe, the second arcuate member is clamped onto the pipe so that the second ridge penetratingly engages the pipe. In an exemplary embodiment, connecting the second arcuate member to the first arcuate member includes extending a fastener through respective openings formed in the first and second arcuate members. In an exemplary embodiment, the first arcuate member has a first axis, a second axis that is perpendicular to the first axis, and a plane in which the second axis lies and to which the first axis is perpendicular; and wherein the method further includes resisting the degree to which the fastener is placed in bending, which bending: is caused in whole or in part by pressurization within the pipe and resulting respective forces applied to the first and second arcuate members in a first axial direction that is generally parallel to the first axis; and urges at least a portion of the fastener to bend in a circumferential direction about an axis that is the same as, or generally parallel, to the second axis and thus is also perpendicular to the first axis. In an exemplary embodiment, resisting the degree to which the fastener is placed in bending includes axially offsetting the fastener from the plane in a second axial direction that is opposite to the first axial direction and thus is also generally parallel to the first axis; wherein a distance in the second axial direction is defined between the plane and the respective openings, wherein the distance is greater than zero. In an exemplary embodiment, resisting the degree to which the fastener is placed in bending includes tapering the first and second inside surfaces so that each of the first and second inside surfaces defines an angle; wherein the angle extends circumferentially from the first axis to the corresponding first or second inside surface in any plane in which the first axis extends, and wherein the vertex of the angle is offset axially from the first axial end portion of the first arcuate member in the second axial direction; wherein the risk of shear failure is generated in whole or in part as a result of pressurization within the pipe; and wherein the tapering of the first and second inside surfaces also causes the degree to which the ridge penetratingly engages the outside surface of the pipe to automatically increase in response to the pressurization within the pipe.

A system has been described that includes a first arcuate member, the first arcuate member including a circumferentially-extending first inside surface and a first ridge extending radially inwardly therefrom, wherein the first inside surface extends axially between first and second axial end portions of the first arcuate member; means for clamping the first arcuate member onto a pipe so that the first ridge penetratingly engages the outside surface of the pipe; and means for reducing a risk of shear failure in a first portion of the pipe, wherein the first portion is located at or near the first axial end portion of the first arcuate member. In an exemplary embodiment, the risk of shear failure is generated in whole or in part as a result of pressurization within the pipe. In an exemplary embodiment, the system includes means for automatically increasing the degree to which the ridge penetratingly engages the outside surface of the pipe in response to the pressurization within the pipe. In an exemplary embodiment, the system includes means for reducing a risk of shear failure in a second portion of the pipe, wherein the second portion of the pipe is located at or near the second axial end portion of the first arcuate member. In an exemplary embodiment, the system includes a second arcuate member, the second arcuate member including a circumferentially-extending second inside surface and a second ridge extending radially inwardly therefrom; wherein means for clamping the first arcuate member onto the pipe includes means for connecting the second arcuate member to the first arcuate member; and wherein, in response to connecting the second arcuate member to the first arcuate member to thereby clamp the first arcuate member onto the pipe, the second arcuate member is clamped onto the pipe so that the second ridge penetratingly engages the pipe. In an exemplary embodiment, means for connecting the second arcuate member to the first arcuate member includes means for extending a fastener through respective openings formed in the first and second arcuate members. In an exemplary embodiment, the first arcuate member has a first axis, a second axis that is perpendicular to the first axis, and a plane in which the second axis lies and to which the first axis is perpendicular; and wherein the system further includes means for resisting the degree to which the fastener is placed in bending, which bending: is caused in whole or in part by pressurization within the pipe and resulting respective forces applied to the first and second arcuate members in a first axial direction that is generally parallel to the first axis; and urges at least a portion of the fastener to bend in a circumferential direction about an axis that is the same as, or generally parallel, to the second axis and thus is also perpendicular to the first axis. In an exemplary embodiment, means for resisting the degree to which the fastener is placed in bending includes means for axially offsetting the fastener from the plane in a second axial direction that is opposite to the first axial direction and thus is also generally parallel to the first axis; wherein a distance in the second axial direction is defined between the plane and the respective openings, wherein the distance is greater than zero. In an exemplary embodiment, resisting the degree to which the fastener is placed in bending also causes the degree to which the ridge penetratingly engages the outside surface of the pipe to automatically increase in response to the pressurization within the pipe.

It is understood that variations may be made in the foregoing without departing from the scope of the disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative exemplary embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. Apparatus adapted to engage a pipe having an outside surface, the apparatus comprising:
   first and second arcuate members, wherein each of the first and second arcuate members has a longitudinal axis, a transverse axis that is perpendicular to the longitudinal axis, and a plane in which the transverse axis lies and to which the longitudinal axis is perpendicular, and wherein each of the first and second arcuate members comprises:
      first and second axial end portions spaced in a direction that is parallel to the longitudinal axis;
      a circumferentially-extending outside surface extending axially between the first and second axial end portions;
      first and second lugs extending radially outwardly from the circumferentially-extending outside surface, wherein the first and second lugs are circumferentially spaced;
      first openings formed through the first and second lugs, respectively, the first openings extending axially through the first and second lugs, respectively;

opposing first and second ears extending from the circumferentially-extending outside surface, wherein the opposing first and second ears extend in opposing directions which are generally parallel to the transverse axis;

second openings extending through the opposing first and second ears, respectively, in a direction that is parallel to the plane and perpendicular to each of the longitudinal axis and the transverse axis;

a circumferentially-extending inside surface extending axially between the first and second axial end portions;

opposing first and second edges at the first and second axial end portions, respectively, the opposing first and second edges extending circumferentially, along with the circumferentially-extending inside surface, wherein the respective centers of curvature of the opposing first and second edges lie on the longitudinal axis;

a circumferentially-extending first chamfer adjacent the first edge, wherein the center of curvature of the first chamfer lies on the longitudinal axis, wherein the first chamfer extends axially away from the first edge in a first direction that is generally parallel to the longitudinal axis, and wherein the extension of the first chamfer from the first edge in the first direction defines a first chamfer angle;

a circumferentially-extending second chamfer adjacent the second edge, wherein the center of curvature of the second chamfer lies on the longitudinal axis, wherein the second chamfer extends axially away from the second edge in a second direction that is opposite the first direction and generally parallel to the longitudinal axis, and wherein the extension of the second chamfer from the second edge in the second direction defines a second chamfer angle;

a first ridge extending radially inwardly from the circumferentially-extending inside surface, the first ridge comprising:
  a first angularly-extending interior ridge face;
  a first angularly-extending exterior ridge face positioned between the first angularly-extending interior ridge face and the first axial end portion; and
  a first distal end in the form of a first peak defined by the joinder of the first angularly-extending interior ridge face and the first angularly-extending exterior ridge face, wherein the first distal end in the form of the first peak is radially offset from the circumferentially-extending inside surface;
and
a second ridge extending radially inwardly from the circumferentially-extending inside surface, the second ridge comprising:
  a second angularly-extending interior ridge face;
  a second angularly-extending exterior ridge face positioned between the second angularly-extending interior ridge face and the second axial end portion; and
  a second distal end in the form of a second peak defined by the joinder of the second angularly-extending interior ridge face and the second angularly-extending exterior ridge face, wherein the second distal end in the form of the second peak is radially offset from the circumferentially-extending inside surface;

wherein the first and second ridges are spaced axially in a parallel relation between the first and second chamfers;

wherein the first chamfer extends axially in the first direction from the first edge and intersects with the first angularly-extending exterior ridge face of the first ridge;

wherein a first intersection angle is defined by the intersection between the first chamfer and the first angularly-extending exterior ridge face of the first ridge, the first intersection angle being less than 180 degrees, the first intersection angle being greater than the sum of the first chamfer angle and 90 degrees;

wherein the second chamfer extends axially in the second direction from the second edge and intersects with the second angularly-extending exterior ridge face of the second ridge; and wherein a second intersection angle is defined by the intersection between the second chamfer and the second angularly-extending exterior ridge face of the second ridge, the second intersection angle being less than 180 degrees, the second intersection angle being greater than the sum of the second chamfer angle and 90 degrees;

wherein the first and second arcuate members are adapted to be connected together and clamped onto the pipe so that the arcuate members extend about respective portions of the outside surface of the pipe;

wherein the first and second chamfers define first and second zones, respectively; and wherein the apparatus is configured so that:
  a compression region of the pipe is defined under each of the first and second arcuate members when the first and second arcuate members are connected together, clamped onto the pipe, and extend about the respective portions of the outside surface of the pipe, and
  first and second transition regions of the pipe are permitted to expand into the first and second zones, respectively, when the first and second arcuate members are connected together, clamped onto the pipe, and extend about the respective portions of the outside surface of the pipe, and the pipe is subjected to an internal fluid pressurization, the first transition region of the pipe being adjacent the first axial end portion and being located axially between the compression region and the first axial end portion, the second transition region of the pipe being adjacent the second axial end portion and being located axially between the compression region and the second axial end portion; and wherein the circumferentially-extending inside surface is tapered at an angle with respect to the longitudinal axis, the taper being offset from the first edge; and wherein the taper begins at one of the first and second chamfers and extends up to the other of the first and second chamfers.

2. The apparatus of claim 1, further comprising:
third and fourth arcuate members adapted to be connected to the first and second arcuate members; and
a plurality of tie rods via which the third and fourth arcuate members are adapted to be connected to the first and second arcuate members.

* * * * *